(12) United States Patent
Dumas et al.

(10) Patent No.: US 11,360,015 B2
(45) Date of Patent: Jun. 14, 2022

(54) SENSOR FOR MEASURING THE CONCENTRATION OF PARTICLES IN AIR

(71) Applicant: ECO LOGIC SENSE SAS, Rousset (FR)

(72) Inventors: Antoine Dumas, Marseilles (FR); Guillaume Gouverneur, Paris (FR); Yulia Glavatskaya, La Celle Saint Cloud (FR); Amanda Martinell, Neauphlle Château (FR)

(73) Assignee: ECO LOGIC SENSE SAS, Rousset (FR)

( * ) Notice: Subject to any disclaimer, the term of this patent is extended or adjusted under 35 U.S.C. 154(b) by 409 days.

(21) Appl. No.: 16/614,094

(22) PCT Filed: May 17, 2018

(86) PCT No.: PCT/EP2018/063018
§ 371 (c)(1),
(2) Date: Nov. 15, 2019

(87) PCT Pub. No.: WO2018/211049
PCT Pub. Date: Nov. 22, 2018

(65) Prior Publication Data
US 2020/0173901 A1  Jun. 4, 2020

(30) Foreign Application Priority Data
May 17, 2017  (FR) ...................................... 1754366

(51) Int. Cl.
*G01N 15/06* (2006.01)
*G01N 15/02* (2006.01)

(52) U.S. Cl.
CPC ..... *G01N 15/0618* (2013.01); *G01N 15/0205* (2013.01); *G01N 2015/0261* (2013.01);
(Continued)

(58) Field of Classification Search
CPC .......... G01N 15/0618; G01N 15/0205; G01N 2015/0283; G01N 2015/0693;
(Continued)

(56) References Cited

U.S. PATENT DOCUMENTS 7,390,339 B1 * 6/2008 Warrick ................... B04C 5/13
96/417
8,104,362 B2 * 1/2012 McFarland ............ B01D 46/06
95/32
(Continued)

FOREIGN PATENT DOCUMENTS

EP          2 679 985 A2   1/2014
WO     WO 2016/065465 A1   5/2016

OTHER PUBLICATIONS

International Search Report as issued in International Patent Application No. PCT/EP2018/063018, dated Oct. 23, 2018.
(Continued)

*Primary Examiner* — David Z Huang
(74) *Attorney, Agent, or Firm* — Pillsbury Winthrop Shaw Pittman LLP

(57) ABSTRACT

A sensor includes an inner channel with: a first portion; a second portion in communication with the first portion; a storage zone in communication with the first portion; a baffle plate extending inside the first portion; the first portion and the baffle plate being sized such that, in an air stream entering the sensor through a first, open end of the first portion and containing first particles with a diameter of 10 μm or less and second particles with a diameter of more than 10 μm, the first particles reach the second portion of the inner channel while the second particles reach the storage zone.

12 Claims, 6 Drawing Sheets

(52) U.S. Cl.
CPC ........... *G01N 2015/0283* (2013.01); *G01N 2015/0693* (2013.01)

(58) Field of Classification Search
CPC ......... G01N 1/2273; G01N 2001/2223; G01N 21/53; G01N 15/06
See application file for complete search history.

(56) References Cited

U.S. PATENT DOCUMENTS

| | | |
|---|---|---|
| 2005/0190058 A1 | 9/2005 | Call |
| 2013/0036793 A1* | 2/2013 | White .............. G01N 15/0255 73/24.02 |

OTHER PUBLICATIONS

Shao, W., et al., "Fine Particle Sensor Based on Multi-Angle Light Scattering and Data Fusion," Sensors, vol. 17, No. 5, May 2017, XP055442307, 16 pages.

Paprotny, I., et al. "Microfabricated air-microfluidic sensor for personal monitoring of airborne particulate matter: Design, fabrication, and experimental results," Sensors and Actuators A: Physical, vol. 201, Jan. 2013, XP055228674, pp. 506-516.

Yuen, L., et al., "Microfluidic-Based Real-Time Detector for Fine Particulate Matter," IEEE Sensors 2014 Proceedings, Nov. 2014, XP032705426, pp. 775-778.

Deng, R. et al., "Focusing Particles with Diameters of 1 to 10 Microns into Beams at Atmospheric Pressure," Aerosol Science and Technology, vol. 42, No. 11, Sep. 2008, XP055282336, pp. 899-915.

"Ambient Air Quality Monitoring—Continuous Particulates Analyzer CPA," Feb. 2017, 2 pages, XP055442261, Retrieved from the Internet: URL: http://web.archive.org/web/20170212015558if_/http://hnunordion.fi/environment/nenetis/CPA%20HNU.pdf, [retrieved on Jan. 18, 2018].

Dong, M., et al., "Integrated Virtual Impactor Enabled $PM_{2.5}$ Sensor," IEEE Sensors Journal, vol. 17, No. 9, May 2017, XP011645742, pp. 2814-2821.

Sun, J., et al., ,"A system of continuous particles monitoring using virtual impactor," 2015 IEEE $12^{th}$ International Conference on Electronic Measurement & Instruments, Jul. 2015, XP032913327, pp. 1183-1187.

\* cited by examiner

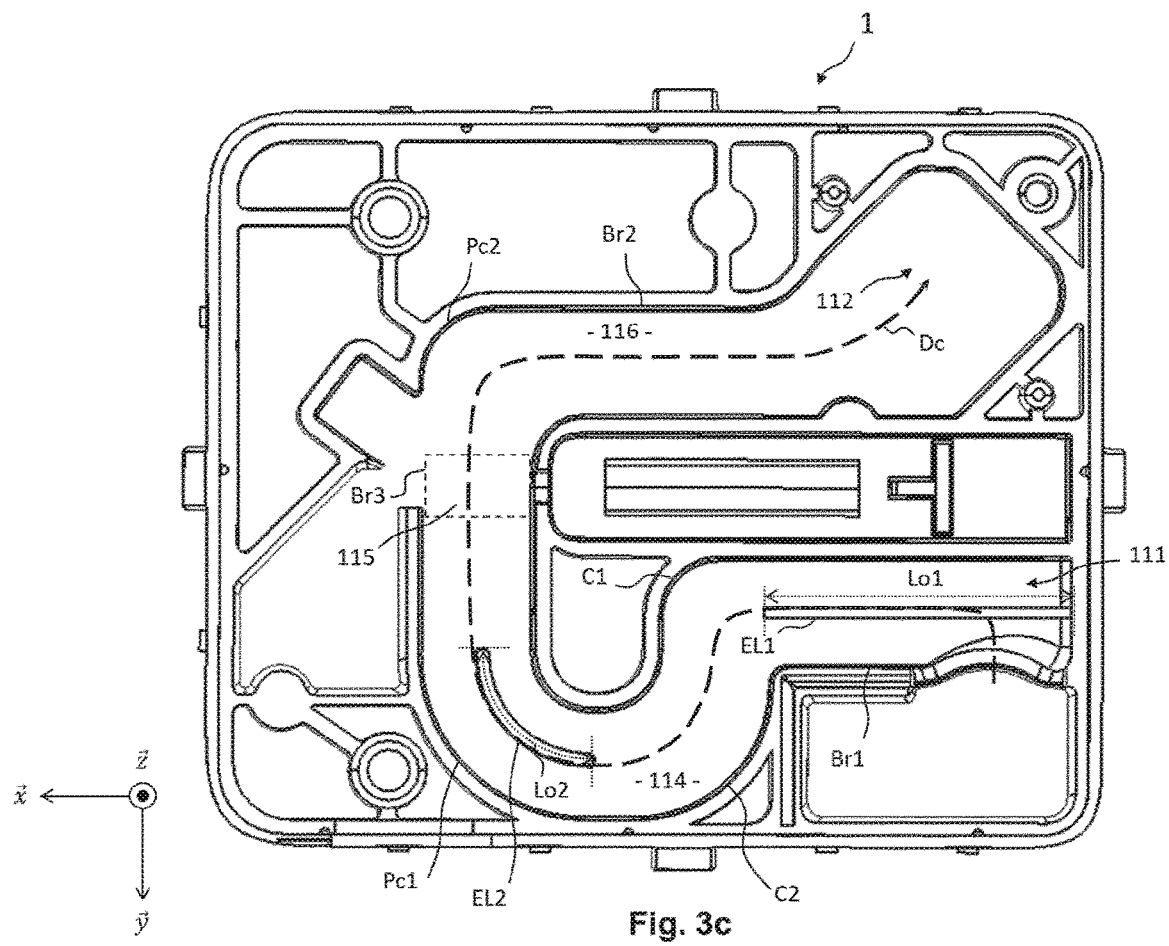
Fig. 3c
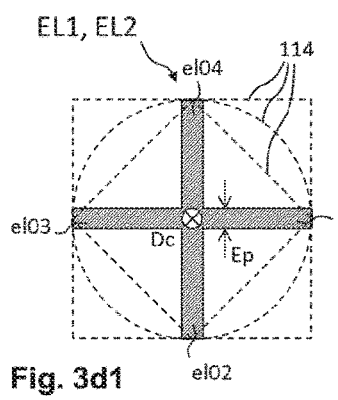
Fig. 3d1
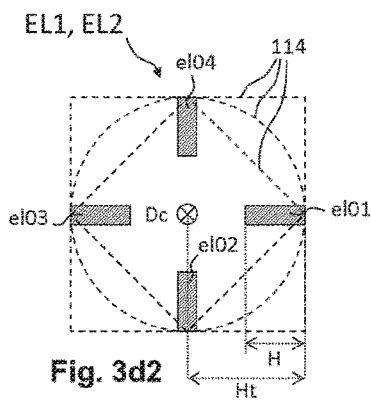
Fig. 3d2
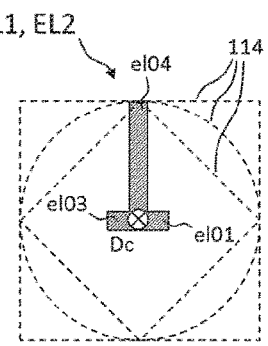
Fig. 3d3

SENSOR FOR MEASURING THE CONCENTRATION OF PARTICLES IN AIR

CROSS REFERENCE TO RELATED APPLICATIONS

This application is the U.S. National Stage of PCT/EP2018/063018, filed May 17, 2018, which in turn claims priority to French Patent Application No. 1754366 filed May 17, 2017, the entire contents of all applications are incorporated herein by reference in their entireties.

TECHNICAL FIELD OF THE INVENTION

The technical field of the invention is that of atmospheric pollution sensors. The present invention relates to a sensor for measuring the concentration of particles in air, not only in a confined, interior environment but also in an exterior environment, in the open air.

TECHNOLOGICAL BACKGROUND OF THE INVENTION

Air quality is an essential parameter to ensure a good quality of life, notably in towns and cities and in urban agglomerations. Among the causes of atmospheric pollution, particles of several μm of diameter are particularly hazardous for human health. These particles are produced to a large extent by human activities linked to industry and transport. They are responsible for health risks such as the alteration of pulmonary functions and can lead to a decrease in life expectancy.

With intense atmospheric pollution episodes becoming more and more frequent, institutions have to put in place solutions for countering these phenomena. These solutions require real time monitoring of the atmospheric concentration of particulate matter. The need to deploy a dense network of sensors is increasingly felt.

Particulate matter (PM) are particles having an aerodynamic diameter less than 10 μm; they are not retained by the upper respiratory tracts (nose, mouth) and are thus "breathable". Particulate matter PM are often classified according to their size. The term PM10 is used for particles having an aerodynamic diameter less than 10 μm; PM2.5 for particles of aerodynamic diameter less than 2.5 μm and PM1 for particles of aerodynamic diameter less than 1 μm. The aerodynamic diameter of a particle is an equivalent value used to describe the aeraulic behaviour of particles in a gas stream such as an air stream. The aerodynamic diameter of a particle is defined as being the diameter of a sphere of unit density (1 g/cm$^3$) and having the same terminal fall velocity as said particle in a fluid at rest. In the remainder of the present application, the terms "aerodynamic diameter of a particle" and "diameter of a particle" are used indifferently.

Today, two methods for measuring particles are mainly used:
- gravimetric techniques consist in accumulating the particles on a filter then quantifying them by direct or indirect weighing;
- optical techniques are based on the perturbation of a light beam by the passage of particles through the light beam.

The simplest gravimetric devices operate by impaction of the particles on a filter which is next weighed. These devices have good size selectivity and are relatively inexpensive but they do not enable real time monitoring of particulate concentration.

Beta gauge systems are based on an electron absorption technique. These systems have the advantage of being very reliable but, in addition to their high cost, they require a radioactive source, which can reduce their portability.

TEOM® (Tapered Element Oscillating Microbalance) gravimetric systems use a microbalance and are employed for regulatory monitoring in certain countries. These systems enable real time monitoring of particulate concentration but they do not enable good selectivity and remain relatively expensive.

Devices exploiting optical techniques are compact, portable and they enable particle size selectivity. These devices are more suited to providing real time information to individuals but suffer from significant drift linked to clogging: they thus require regular maintenance and cleaning, which can prove to be costly and/or difficult.

SUMMARY OF THE INVENTION

The invention offers a solution to the aforementioned problems by making it possible to measure in real time the concentration of particles in air with a device that is at the same time compact, portable and size selective for the particles, while not requiring any maintenance or cleaning.

An aspect of the invention concerns a sensor for measuring in real time the concentration of particles in air characterised in that it comprises an inner channel having:
- a first portion comprising a side wall extending between a first open end and a second closed end, the first open end extending along an inlet plane;
- a second portion communicating with the first portion via a first opening in the side wall of the first portion, the first opening being adjacent to the first open end;
- a storage zone communicating with the first portion via a second opening in the side wall of the first portion, the second opening being adjacent to the second closed end, the first and second openings being arranged on either side of the side wall;
- a baffle plate fixed to a junction between the first open end of the first portion and the second portion, the baffle plate extending inside the first portion and forming with a first direction normal to the inlet plane an angle α such that:

$$0° < \alpha < 90°$$

the baffle plate, the first portion and the first and second openings being dimensioned in such a way that in an air stream entering into the sensor through the first open end and comprising first particles of a diameter less than or equal to 10 μm and second particles of a diameter greater than 10 μm, the first particles are deflected by the baffle plate, pass through the first opening and arrive in the second portion of the inner channel whereas the second particles are deflected by the baffle plate, impacted by a part of the side wall forming an impaction plate, pass through the second opening and arrive in the storage zone.

Thanks to the invention, the inner channel of the sensor ensures at the inlet a filter function: only the first particles penetrate into the second portion of the inner channel to be detected later, whereas the second particles are deflected into a storage zone. The first and second particles, of different sizes, are in fact of different masses and thus inertias, which is why they do not follow the same fluidic path. This thereby avoids clogging of the second portion of the inner channel by the second particles, which would lead to a drift in the response of the sensor and the measurement artefacts. Since no measurement is carried out in the storage zone, its clogging by the second particles is not problematic.

Apart from the characteristics that have been mentioned in the preceding paragraph, the sensor according to an aspect of the invention may have one or more complementary characteristics among the following, considered individually or according to all technically possible combinations thereof:

The second portion of the inner channel has a first open end communicating with the first portion of the inner channel and a second open end, and the sensor comprises a device for circulating an air stream in the inner channel, said device being arranged at the second end of the second portion of the inner channel and being configured to make an air stream circulate from the first end of the first portion of the inner channel to the second end of the second portion of the inner channel.

The device for circulating an air stream in the inner channel is a fan or a pump.

Having defined a first flow surface which is the surface along the inlet plane of the first open end, and a second flow surface which is the smallest flow surface of the first portion, defined between the end of the baffle plate and the side wall: the ratio S2/S1 of the second surface over the first surface is such that:

$$10\% \leq \frac{S2}{S1} \leq 90\%$$

The second portion of the inner channel having a first open end communicating with the first portion of the inner channel and a second open end, and the second portion of the inner channel comprising a detection zone, an upstream zone between the first end and the detection zone and a downstream zone between the detection zone and the second end, the sensor is preferentially such that:

the second portion of the inner channel has a folded back shape, and the upstream zone of the inner channel has an inclined portion widening between the first end of the inner channel and the detection zone,
  the inclined portion forming an angle β, measured with respect to the vertical, such that: 60°≤β≤80°, and
  the inclined portion widening from 150 μm² to 300 μm² per mm length.

The storage zone has a volume comprised between 0.5 mL and 5 mL.

The first portion of the inner channel is of circular section and the sensor comprises an adaptor piece of hollow cylinder shape of circular section, the adaptor piece projecting from the sensor at the level of the first open end of the first portion.

The second portion has a first open end which communicates with the first portion and a second open end; a detection zone; an upstream zone between the first end and the detection zone; and a downstream zone between the detection zone and the second end; the second portion has a folded back shape with a first rectilinear branch connected to a second rectilinear branch by a link substantially perpendicular to the first and second rectilinear branches, in such a way that the upstream zone comprises the first rectilinear branch, the downstream zone comprises the second rectilinear branch and the detection zone is found in the link between the first and second rectilinear branches.

The upstream zone further comprises at least one portion having an S shape with first and second bends.

The inner channel extending at each point along a direction Dc and "section of a portion of the inner channel" signifying a section normal to the direction Dc: the second portion has a first open end which communicates with the first portion and a second open end; a detection zone; an upstream zone between the first end and the detection zone; and a downstream zone between the detection zone and the second end; and the upstream zone of the second portion comprises a laminarisation element, which comprises at least one plate projecting radially from a side wall of the second portion, said at least one plate having a height H measured radially and of which the ratio over the total height Ht measured radially between the side wall and the centre of the section is such that:

$$10\% \leq H/Ht \leq 100\%.$$

Advantageously, the inner channel comprises a detection zone and the sensor for measuring in real time the concentration of particles in air comprises:
  a light source configured to emit light radiation in a direction of propagation, the light radiation being focused in the detection zone of the inner channel;
  a first photodetector configured to capture a first scattering signal emitted by particles traversing the detection zone in a first direction forming a first non-zero angle with the direction of propagation of the light radiation;
  a second photodetector configured to capture a second scattering signal emitted by particles traversing the detection zone in a second direction forming a second non-zero angle with the direction of propagation of the light radiation, the second angle being different from the first angle and the first and second angles not being supplementary;
  a light trap configured to receive the light radiation at the outlet of the detection zone so as to prevent parasitic return of the light radiation to the detection zone.

This thus provides information on the difference in scattered light intensity, between the first scattering signal emitted in the first direction and the second scattering signal emitted in the second direction, which makes it possible to increase precision on information on the granulometry of the particles that traverse the detection zone and thus to increase the precision of the sensor according to an aspect of the invention. Indeed, two particles of different sizes each have a distinct angular scattering.

The difference between the first and second angles is at least 5° and preferentially at least 15°.

The first direction and the direction of propagation defining a first plane, the second direction preferentially belongs to a second plane distinct from the first plane, and preferentially perpendicular to the first plane.

The light trap comprises a black wall and black cavity, the wall deflecting the light radiation towards the cavity. The wall is preferentially smooth whereas the cavity is rough.

Advantageously, the inner channel comprises a detection zone and the sensor further comprises a device for heating an air stream circulating in the inner channel, the heating device comprising at least one Joule effect heating element arranged on a wall of the inner channel upstream of the detection zone.

A control of the hygrometry of the particles of the air stream is thereby enabled in order to be free of external atmospheric conditions. Indeed, certain types of particle swell significantly under the effect of humidity, which is susceptible, by modifying the size of the particles, to falsify the measurements. By controlling the hygrometry of the air stream, the precision of the sensor according to an aspect of the invention is thus improved.

The heating device preferentially comprises a plurality of Joule effect heating elements in series.

The heating device preferentially comprises means for controlling the at least one Joule effect heating element as a function of a first measurement of temperature and of a second measurement of humidity.

The at least one Joule effect heating element is preferentially a resistance or alternatively a linear regulator.

The invention and its different applications will be better understood on reading the description that follows and by examining the figures that accompany it.

BRIEF DESCRIPTION OF THE FIGURES

The figures are presented for indicative purposes and in no way limit the invention.

FIG. 3c schematically shows a view of an inner channel of a sensor along a sectional plane of axes $\vec{x}$, $\vec{y}$, according to a second embodiment.

FIG. 3d1 schematically shows a first example of laminarisation element within an inner channel of a sensor according to any one of the embodiments of the invention.

FIG. 3d2 schematically shows a second example of laminarisation element within an inner channel of a sensor according to any one of the embodiments of the invention.

FIG. 3d3 schematically shows a third example of laminarisation element within an inner channel of a sensor according to any one of the embodiments of the invention.

DETAILED DESCRIPTION OF AT LEAST ONE EMBODIMENT OF THE INVENTION

Unless stated otherwise, a same element appearing in the different figures has a single reference.

The figures are defined in an orthogonal coordinates system of axes $\vec{x}$, $\vec{y}$, $\vec{z}$.

Figure 1:
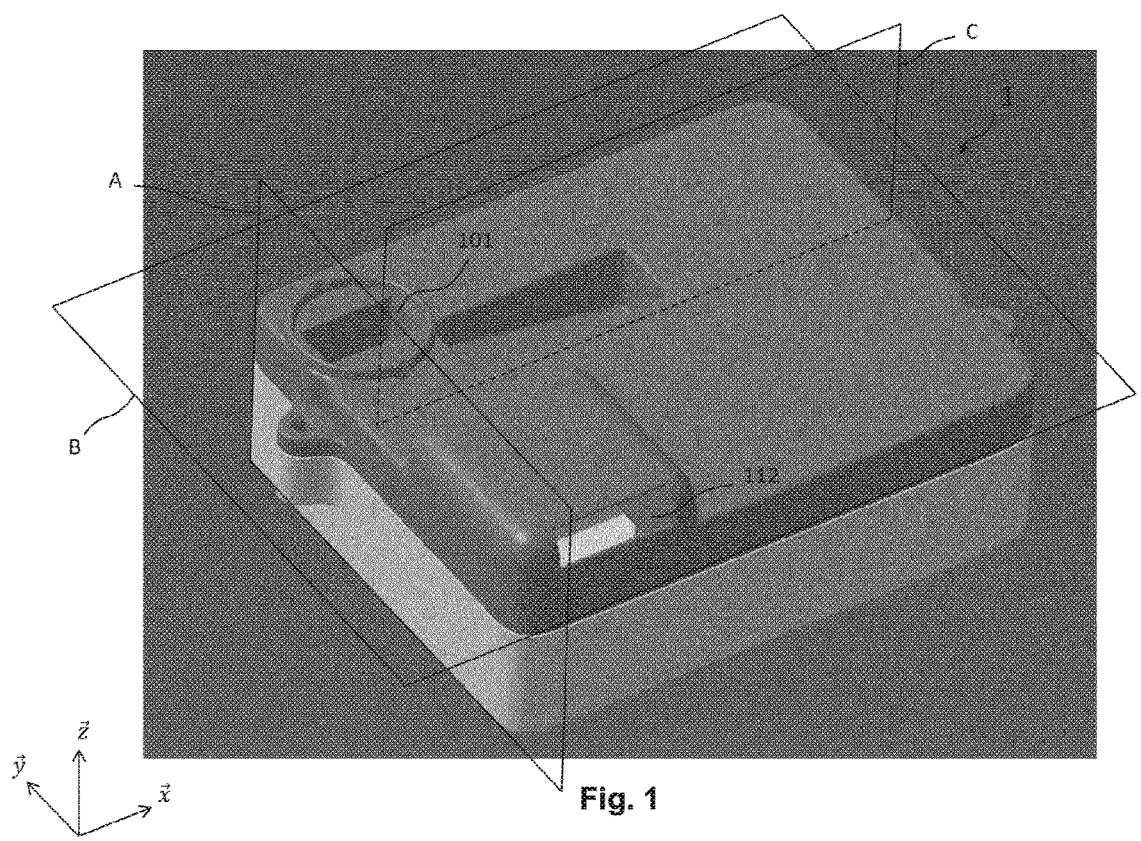
FIG. 1 schematically shows a perspective view of a sensor for measuring in real time the concentration of particles in air according to an aspect of the invention.

FIG. 1 schematically shows a perspective view of a sensor 1 for measuring in real time the concentration of particles in air according to an embodiment of the invention. FIG. 1 shows a sectional plane A of axes $\vec{y}$, $\vec{z}$, a sectional plane B of axes $\vec{x}$, $\vec{y}$ and a sectional plane C of axes $\vec{x}$, $\vec{z}$. The sensor 1 comprises an inner channel 10 (referenced in FIG. 2a) having a first portion 100 and a second portion 110 (referenced in FIG. 2b), the first portion having a first open end 101 forming an inlet of an air stream in the inner channel of the sensor 1, and the second portion having a second open end 112 forming an outlet of the air stream of the inner channel of the sensor 1. The air inlet 101 and the air outlet 112 preferentially extend along two distinct planes, and even more preferentially along two planes that are not parallel with each other, in order that the air stream at the inlet is not perturbed by the airstream at the outlet. In the particular example illustrated in FIG. 1, the air inlet 101 extends along a plane substantially parallel to the sectional plane B, whereas the air outlet 112 extends along a plane substantially parallel to the sectional plane C.

Figure 2A:
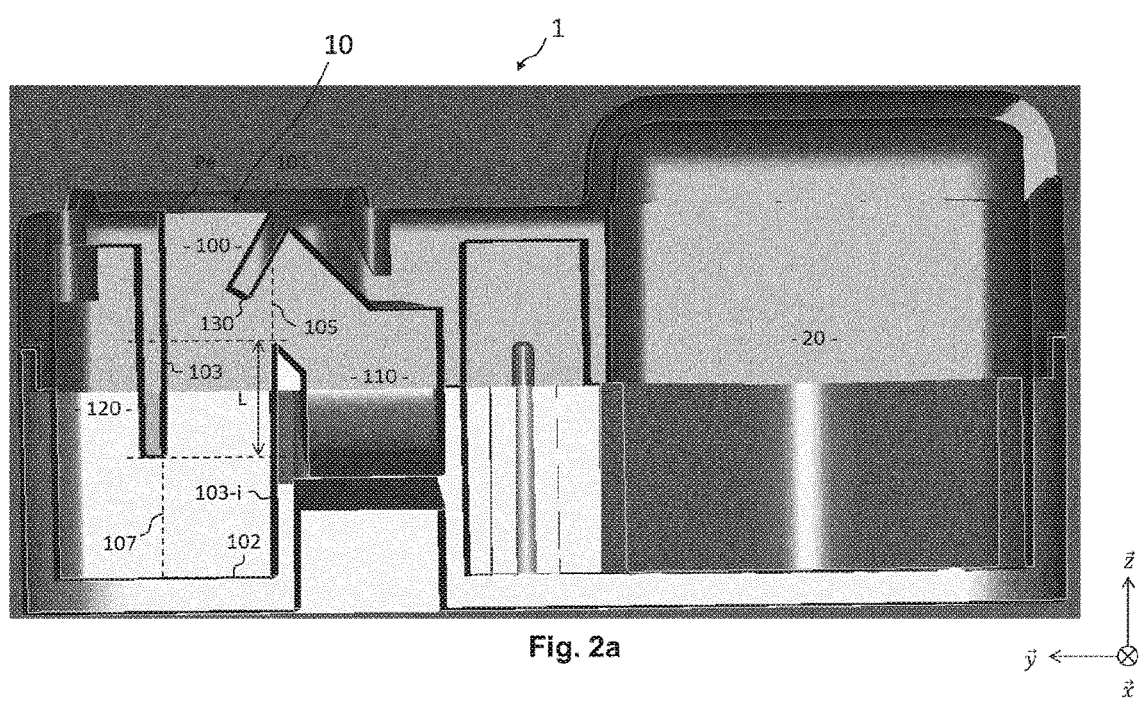
FIG. 2a schematically shows a view of an inner channel of the sensor of FIG. 1 along the sectional plane of axes $\vec{y}$, $\vec{z}$.
Figure 2B:
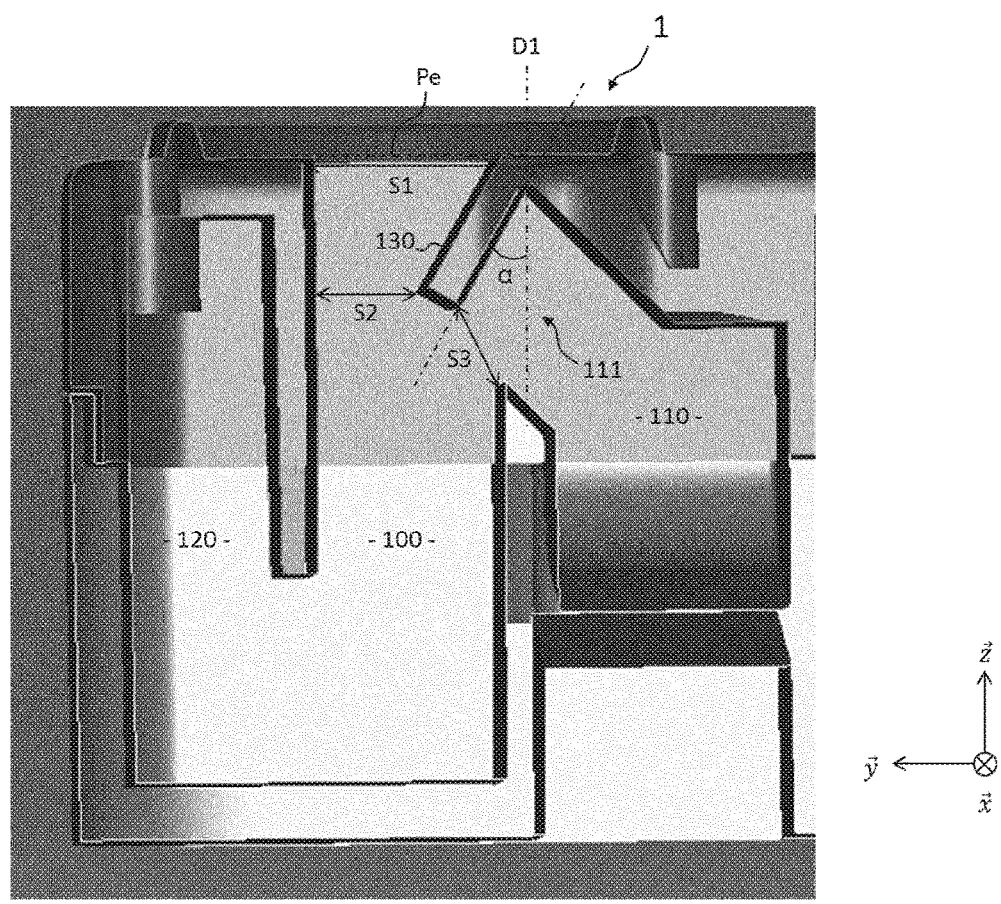
FIG. 2b schematically shows a partial view of the inner channel of the sensor of FIG. 1 along the sectional plane of axes $\vec{y}$, $\vec{z}$.

FIG. 2a schematically shows a view along the sectional plane A of the inner channel 10 of the sensor 1. FIG. 2b schematically shows a partial view along the sectional plane A of the inner channel 10 of the sensor 1. FIGS. 2a and 2b particularly illustrate a function of fluidic filter of the sensor 1 and are described jointly.

The sensor 1 comprises an inner channel 10 having:
the first portion 100 comprising a side wall 103 extending between the first open end 101 and a second closed end 102, the first open end 101 extending along an inlet plane Pe;
the second portion 110 communicating with the first portion 100 via a first opening 105 in the side wall 103 of the first portion 100, the first opening 105 being adjacent to the first open end 101;
a storage zone 120 communicating with the first portion 100 via a second opening 107 in the side wall 103 of the first portion 100, the second opening being adjacent to the second closed end 102, the first and second openings 105, 107 being arranged on either side of the side wall 103;
a baffle plate 130 fixed to a junction between the first open end 101 of the first portion 100 and the second portion 110, the baffle plate 130 extending inside the first portion 100 and forming with a first direction D1 normal to the inlet plane Pe an angle α such that:

$$0° < \alpha < 90°$$

the baffle plate 130, the first portion 100 and the first and second openings 105, 107 being dimensioned in such a way that in an air stream entering into the sensor 1 through the first open end 101 and comprising first particles of diameter less than or equal to 10 μm and second particles of diameter greater than 10 μm, the first particles pass through the first opening 105 and arrive in the second portion 110 of the inner channel whereas the second particles pass through the second opening 107 and arrive in the storage zone 120.

The first and second openings 105, 107, arranged on either side of the side wall 103, are not opposite each other, that is to say that any plane of axes $\vec{x}$, $\vec{y}$ and passing through the first opening 105 does not pass through the second opening 107, and vice versa. There exists preferentially a portion of side wall 103 of a length L at least equal to 2 mm between the first and second openings 105, 107. "The first and second openings 105, 107 are arranged on either side of the side wall 103" is taken to mean the fact that:
- the first opening 105 is found in a first half-space, to which the baffle plate 130 and the second portion 110 of the inner channel belong, and
- the second opening 107 is found in a second half-space, to which the storage zone 120 belongs.

A part of the side wall 103 is an impaction plate 103-i: it is the part of the side wall 103 that is arranged on the side of the first opening 105, in the first half-space. The impaction plate 103-i is arranged on the side of the first opening 105.

In the particular example which is illustrated in FIGS. 2a and 2b, the first portion 100 is rectilinear along the first direction D1. However, the first portion 100 may alternatively be curved.

In the particular example which is illustrated in FIGS. 1, 2a and 2b, the first portion 100 and the second portion 110 are of rectangular section. However, the first portion 100 and/or the second portion 110 may alternatively be of square, polygonal, circular, elliptical section, etc. The first portion 100 and the second portion 110 may both have a same geometry of section, for example may both be of circular section, or instead each may have a distinct geometry of section, for example circular section for the first portion 100 and rectangular or square section for the second portion 110. Generally speaking, "section of a portion" is taken to mean a section normal to a direction Dc (represented for example in FIGS. 3a and 3c) along which extends the portion of the inner channel at each point and along which an air stream is made to circulate. In the particular example where the first portion 100 is rectilinear along the first direction D1, each section of the first portion 100 is along a plane parallel to the plane B of axes $\vec{x}$, $\vec{y}$. Generally speaking, it is wished to define a certain velocity of the air stream through the inner channel 10. To do so, the determining parameter is the surface of the section of each of the first and second portions 100, 110. It is understood that several different geometries may be associated with a same surface.

Figure 2C:
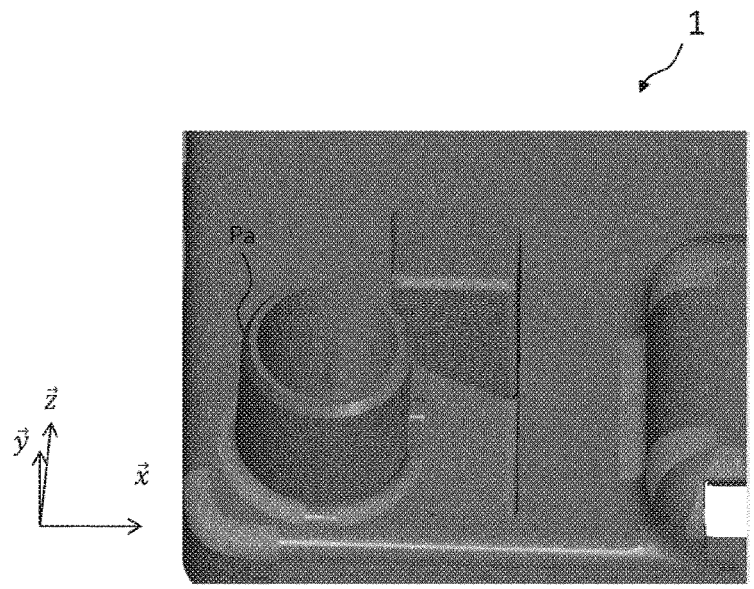
FIG. 2c schematically shows a partial view of a sensor according to an aspect of the invention comprising an adaptor piece.

Advantageously, the first portion 100 is of circular section and the sensor 1 comprises an integrated adaptor piece Pa, projecting from the sensor 1 at the level of the first open end 101 of the first portion 100, so as to offer a prolongation of the first portion 100. This configuration is illustrated in FIG. 2c. The adaptor piece Pa has a hollow cylinder shape, of circular section of same diameter or of different diameter compared to the circular section of the first portion 100. The adaptor piece Pa is a single piece with the sensor 1; the adaptor piece Pa may notably be moulded with the sensor 1. The adaptor piece Pa makes it possible to receive a tube.

First, second and third flow surfaces S1, S2, S3 are represented in FIG. 2b:
- the first surface S1 is the inlet surface of the inner channel 10, that is to say the flow surface along the inlet plane Pe of the first open end 101 of the first portion 100 of the inner channel 10;
- the second surface S2 is the smallest flow surface of the first portion 100, defined between the end of the baffle plate 130 and the side wall 103;
- the third surface S3 is the smallest flow surface defined between the end of the baffle plate 130 and the end of the impaction plate 103-i delimiting the first opening 105.

The ratio S2/S1 of the second surface S2 over the first surface S1 is advantageously such that:

$$10\% \leq \frac{S2}{S1} \leq 90\%$$

Preferentially such that:

$$30\% \leq \frac{S2}{S1} \leq 90\%$$

And even more preferentially such that:

$$30\% \leq \frac{S2}{S1} \leq 75\%$$

The filter function at the inlet of the inner channel 10 of the sensor 1 is thus optimised.

According to a particular example, the first surface S1 has a surface area of 50 mm² and the second surface S2 has a surface area of 30 mm², i.e. a ratio S2/S1 of 60%.

The cut off diameter d, that is to say the aerodynamic diameter such that 50% of the particles of this diameter arrive in the second portion 110 of the inner channel and 50% do not arrive therein, may be estimated by the following formula:

$$d \propto k \frac{u}{l\alpha\rho}$$

where d is expressed in µm; k is a constant expressed in µm·s·rad; u is the velocity of the air stream passing through the third surface S3; l is the length of the baffle plate 130 expressed in m; α is the angle expressed in rad that the baffle plate 130 forms with the first direction D1; ρ is the density of the considered particles:

$$\rho = \frac{\text{density of the considered particles}}{\text{reference density}}$$

The reference density is 1 g/cm³.

The angle α, illustrated in particular in FIG. 2b, is preferentially such that:

$$15° \leq \alpha \leq 75°$$

The angle α is more preferentially such that:

$$15° \leq \alpha \leq 45°$$

The angle α is even more preferentially such that:

$$25° \leq \alpha \leq 35°$$

For an angle α of 30°, a baffle plate 130 of length l=4 mm and a velocity u of the air stream passing through the third surface S3 of 5 m/s:

a cut off diameter d greater than 10 µm is obtained for particles of density p=1;

a cut off diameter d greater than 3 µm is obtained for particles of density p=3.

The smaller the cut off diameter d, the smaller the diameter of the particles that actually arrive in the second portion 110. It is observed that the density of the particles has an important influence on the results.

The storage zone 120 advantageously has a volume comprised between 0.5 mL and 5 mL. This makes it possible to guarantee a sufficient maintenance-free lifetime of the sensor 1, that is to say greater than 10,000 hours in environments highly polluted with particulate matter. It is considered that an environment is highly polluted with particulate matter when it comprises on average at least 250 µg/m³ of particulate matter. At the same time, the cumulative volume of the first portion 100 of the inner channel and the storage zone 120 is advantageously less than 10 mL. This makes it possible to limit the size of the sensor 1, and thus its bulk and its mass.

Figure 3A:
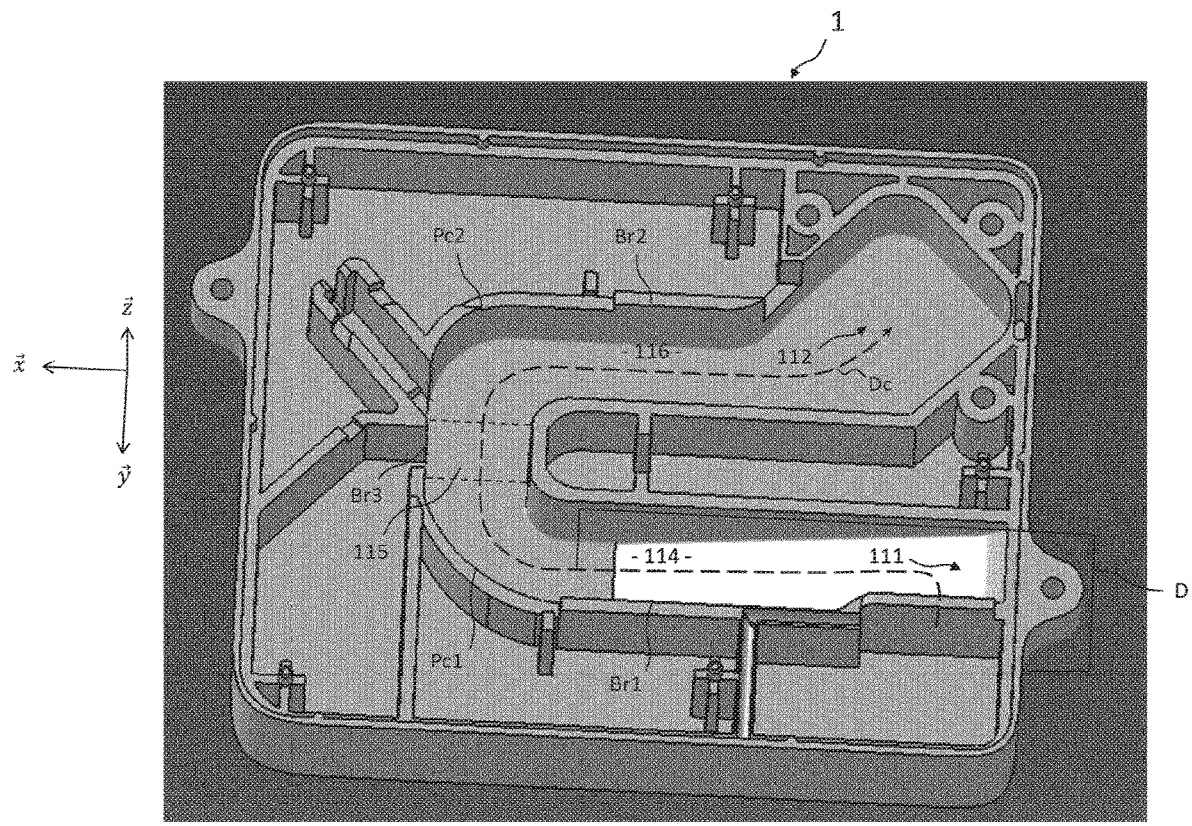
FIG. 3a schematically shows a view of the inner channel of the sensor of FIG. 1 along the sectional plane of axes $\vec{x}$, $\vec{y}$, according to a first embodiment.
Figure 3B:
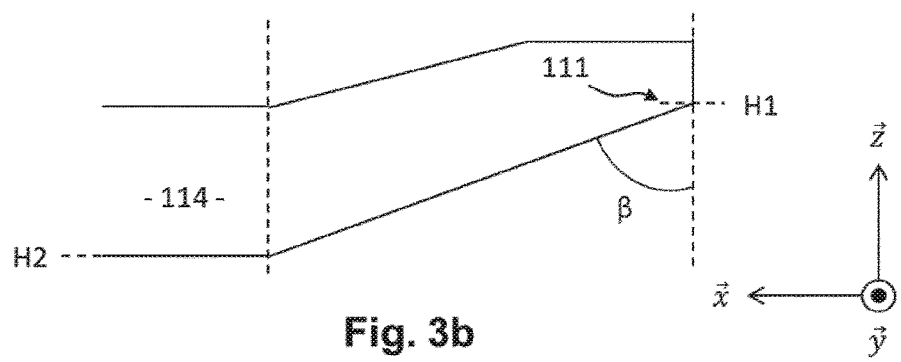
FIG. 3b schematically shows a partial view of the inner channel of the sensor of FIG. 1 along a sectional plane of axes $\vec{x}$, $\vec{z}$.

FIG. 3a schematically shows a view along the sectional plane B of the sensor 1 according to a first embodiment. FIG. 3a shows a sectional plane D of axes $\vec{x}$, $\vec{z}$. FIG. 3b schematically shows a partial view along the sectional plane D of the sensor 1. FIG. 3b schematically shows a view along the sectional plane B of the sensor 1 according to a second embodiment. FIGS. 3a, 3b and 3c are described jointly.

The second portion 110 of the inner channel has a first open end 111 which communicates with the first portion 100 of the inner channel, and the second open end 112. The second portion 110 of the inner channel comprises a detection zone 115, an upstream zone 114 between the first end 111 and the detection zone 115, and a downstream zone 116 between the detection zone 115 and the second end 112.

In order to improve the compactness of the sensor 1, the second portion 110 of the inner channel advantageously has a folded back shape, with a first rectilinear branch Br1 connected to a second rectilinear branch Br2 by a link substantially perpendicular to the first and second rectilinear branches Br1, Br2. The first and second rectilinear branches Br1, Br2 may be parallel with each other but are not necessarily parallel with each other. The upstream zone 114 comprises the first rectilinear branch Br1, the downstream zone 116 comprises the second rectilinear branch Br2 and the detection zone 115 is found in the link between the first and second rectilinear branches Br1, Br2. Another advantage of the folded back shape is to move the detection zone 115 away from the inlet 101 and from the outlet 112 of the inner channel in order to limit the risk of external parasitic light in the detection zone 115. The folded back shape illustrated in FIG. 3a may also be described as comprising the first rectilinear branch Br1, the second rectilinear branch Br2 and a third rectilinear branch Br3 substantially perpendicular to the first and second rectilinear branches Br1, Br2, the third rectilinear branch Br3 being connected to the first rectilinear branch Br1 by a first bent portion Pc1 and to the second rectilinear branch Br2 by a second bent portion Pc2. The link defined previously between the first and second rectilinear branches Br1, Br2 comprises the third rectilinear branch Br3 and the first and second bent portions Pc1, Pc2. The upstream zone 114 comprises the first rectilinear branch Br1 and the first bent portion Pc1, the downstream zone 116 comprises the second bent portion Pc2 and the second rectilinear branch Br2, and the detection zone 115 is found in the third rectilinear portion Br3.

The upstream zone 114 may further comprise at least one portion having an S shape with a first bend C1 and a second bend C2, and illustrated in FIG. 3c. In this case, the first rectilinear branch Br1 may be found upstream or downstream of the first and second bends C1, C2.

At the same time, the geometry and the dimensioning of the upstream zone 114 are advantageously chosen in such a way that an air stream perturbed by the first portion 100 of the inner channel and entering into the second portion 110 of the inner channel is laminar and with a homogeneous velocity when it arrives at the level of the detection zone 115. It is considered that the air stream has a homogeneous velocity in the detection zone 115 when at each point of a section of the detection zone, the velocity v along the axis y perpendicular to said section is such that:

$$0.8 \times v_m \leq v \leq 1.2 \times v_m$$

with $v_m$ the average velocity in said section.

To do so, the upstream zone 114 of the inner channel has a widening inclined portion while connecting a first horizontal plane H1, along which the first end 111 of the inner channel extends substantially, to a second horizontal plane H2, along which the inner channel extends substantially between its detection zone 115 and its second end 112. The inclination β of this portion, measured with respect to the vertical, is such that:

$$60° \leq \beta \leq 80°$$

The widening of the inclined portion of the upstream zone 114 of the inner channel is comprised between 150 and 300 µm² per mm length along the axis $\vec{x}$. The inclined portion that has been described is illustrated in particular in relation with the first embodiment of FIG. 3a but it is also compatible with the second embodiment of FIG. 3c.

The upstream zone 114 of the inner channel may also have a laminarisation element, projecting from at least one side wall of the second portion 110 and extending along the direction along which extends the inner channel 10 at each point and along which an air stream is made to circulate. The laminarisation element is thus rectilinear if it is found in a rectilinear part of the second portion 110, curved if it is found in a bent portion of the second portion. The laminarisation element may be in one piece or comprise several distinct parts, thus in the example of FIG. 3c the laminarisation element comprises a first rectilinear sub-element EL1 in the first rectilinear branch Br1 and a second bent sub-element EL2 in the first bent portion Pc1. The length of the laminarisation element, or the cumulative length of the sub-elements of the laminarisation element measured along the direction Dc, can vary between 0.1% and 100%, preferentially between 10% and 60% of the length of the upstream zone 114 measured along the direction Dc. In FIG. 3c, the length of the first sub-element EL1 is referenced "Lo1" and the length of the second sub-element EL2 is referenced "Lo2". Hereafter, "laminarisation element" will be taken to mean the laminarisation element or each of its sub-elements. The laminarisation element is illustrated in particular in relation with the second embodiment of FIG. 3c but it is also compatible with the first embodiment of FIG. 3a.

FIGS. 3d1, 3d2 and 3d3 respectively show first, second and third examples of laminarisation elements, represented with hatching. Each of the FIGS. 3d1, 3d2 and 3d3 is a sectional view of the upstream zone 114, along a plane normal to the direction Dc. Different possible geometries of section of the second portion 110 are represented in dotted lines.

Generally speaking, the laminarisation element comprises at least one plate projecting from the side wall represented in dotted lines and oriented radially with respect to the direction Dc (which corresponds to the direction normal to the plane of the sheet and passing through the centre of each geometry of section), said at least one plate having a height H (referenced in FIG. 3*d*2) measured radially with respect to the direction Dc and of which the ratio over the "total" height Ht (referenced in FIG. 3*d*2) between the side wall and the centre of the section is such that: 10%≤H/Ht≤100%. Each plate of the laminarisation element has a thickness Ep (referenced in FIG. 3*d*1), measured at each point perpendicular to the direction Dc and to the radial direction, such that: 0.1 mm≤Ep≤2 mm and more preferentially such that: 0.5 mm≤EP≤1 mm.

According to the example of FIG. 3*d*1, the laminarisation element comprises first, second, third and fourth plates el01, el02, el03, el04 according to the above definition, more specifically all of same height H such that H=Ht in such a way that they are joined at the centre of the section. According to the first example, the laminarisation element thus has a cruciform profile.

According to the example of FIG. 3*d*2, the first, second, third and fourth plates el01, el02, el03, el04 are all of same height H such that H<Ht, in such a way that they are not joined at the centre of the section. Alternatively, and in accordance with the definition given first of all, the laminarisation element may comprise one, two or three plates among four—according to all possible combinations: first plate; first and second plates; first and third plates: first and fourth plates; first, second and third plates; etc. Furthermore:

when the laminarisation element comprises several plates, they may be of same height or of different heights. All the plates may be joined (as in the example of FIG. 3*d*1), or only a part, or none (as in the example of FIG. 3*d*2).

When the laminarisation element comprises several sub-elements, they may be of different geometry and/or dimensions. Thus, in the example of FIG. 3*c*, the first sub-element EL1 comprises a single plate projecting from the side wall along the direction z and of height H such that H/Ht=20%; whereas the second sub-element EL2 also comprises a single plate projecting from the side wall along the direction $\vec{z}$ but this time of height H such that H/Ht=35%.

According to the example of FIG. 3*d*3, the laminarisation element comprises the fourth plate el04 of height H=Ht, which projects from the side wall and reaches the centre of the section, and the first and third plates el01, el03 of height H<Ht, the first and third plates el01, el03 not projecting from the side wall but from the end of the fourth plate el04 at the centre of the section, in such a way that the laminarisation element has a "T" profile.

The sensor 1 preferentially comprises a device 20 for circulating an air stream in the inner channel 10, referenced in FIG. 2*a*, which is arranged at the second end 112 of the second portion 110 of the inner channel and which is configured to make an air stream circulate from the first end 101 of the first portion 100 of the inner channel to the second end 112 of the second portion 110 of the inner channel. The device 20 may advantageously be enslaved in order to ensure a constant average velocity of the air stream at the level of the detection zone 115. In an exemplary embodiment of the invention, the air stream through the inner channel 10 of the sensor 1 has a flow rate of 0.0032 m³/min and the head loss generated by the inner channel 10 is calculated at 9.6 Pa: in this exemplary embodiment, the device 20 is advantageously enslaved in order to ensure an average velocity of 1 m/s at the level of the detection zone 115. The device 20 may notably be a fan, a pump or micro-pump.

Figure 4A:
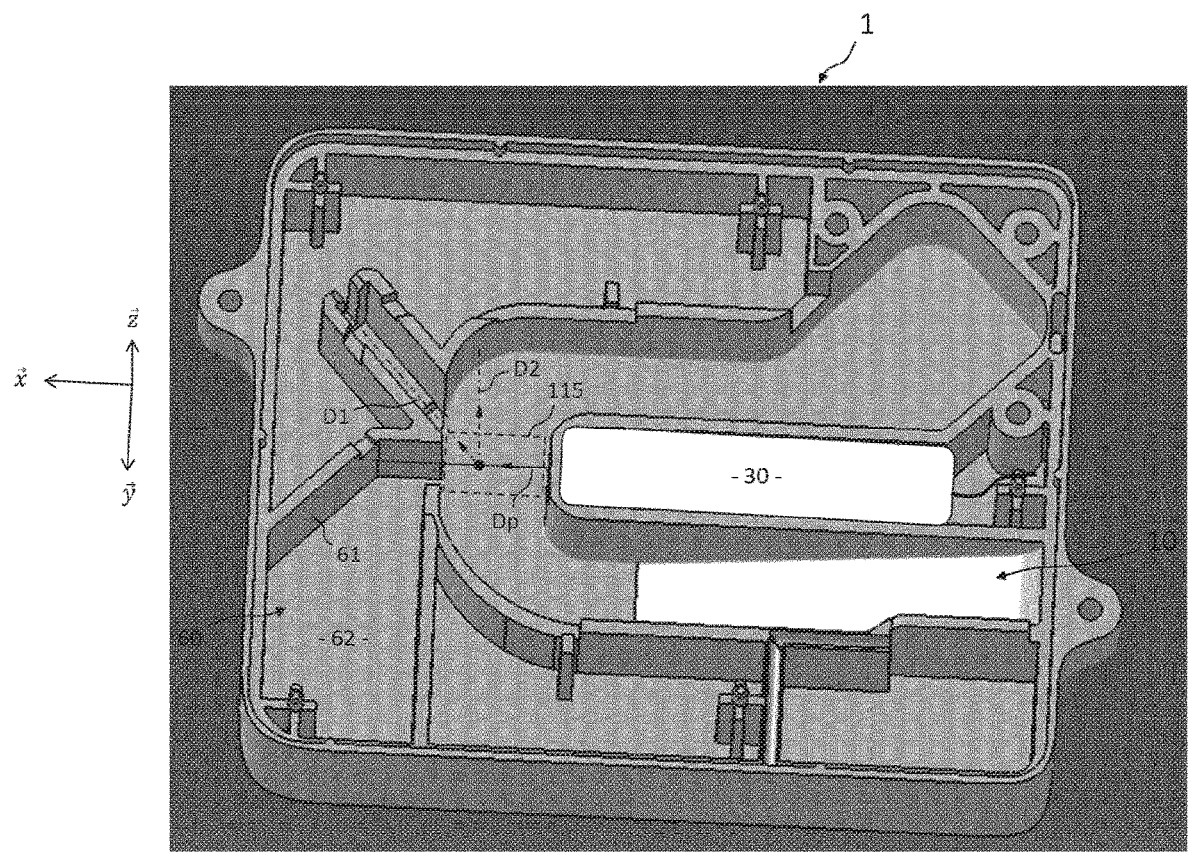
FIG. 4a schematically shows a view of an optical detection system of the sensor of FIG. 1 along a sectional plane of axes $\vec{x}$, $\vec{y}$.
Figure 4B:
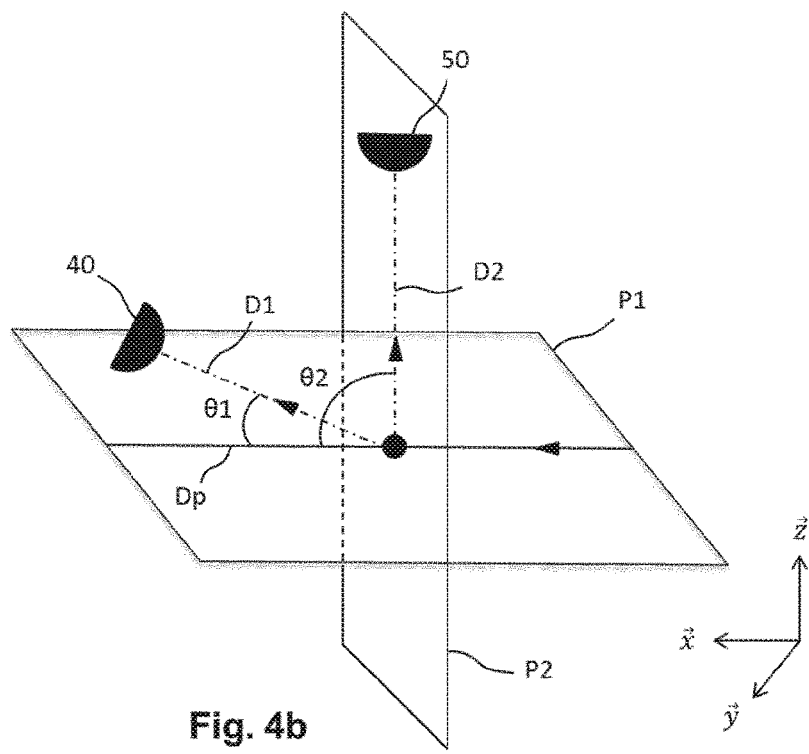
FIG. 4b schematically shows a partial perspective view of the optical detection system of the sensor of FIG. 1.

FIG. 4*a* schematically shows a view of an optical detection system of the sensor 1 along the sectional plane B of axes $\vec{x}$, $\vec{y}$. FIG. 4*b* schematically shows a partial perspective view of the optical detection system of the sensor 1. FIGS. 4*a* and 4*b* particularly illustrate an optical detector function of the sensor 1 and are described jointly. The optical detector function is compatible with all the embodiments and characteristics described previously in relation with the fluidic circulation, and notably with the embodiments described in relation with FIGS. 3*a*, 3*b*, 3*c*, 3*d*1, 3*d*2, 3*d*3.

The optical detection system of the sensor 1 comprises:
- a light source 30 configured to emit light radiation in a direction of propagation Dp, the light radiation being focused in the detection zone 115 of the inner channel 10;
- a first photodetector 40 configured to capture a first scattering signal emitted in a first direction D1 by particles traversing the detection zone, the first direction D1 forming a first non-zero angle θ1 with the direction of propagation Dp of the light radiation;
- a second photodetector 50 configured to capture a second scattering signal emitted in a second direction D2 by particles traversing the detection zone, the second direction D2 forming a second non-zero angle θ2 with the direction of propagation Dp of the light radiation, the second angle θ2 being different from the first angle θ1 and the first and second angles θ1, θ2 not being supplementary;
- a light trap 60 configured to receive the light radiation at the outlet of the detection zone 115 so as to prevent parasitic return of the light radiation to the detection zone 115.

This thus provides information on the difference in scattered light intensity, between the first scattering signal emitted in the first direction and the second scattering signal emitted in the second direction, which makes it possible to increase precision on information on the granulometry of the particles that traverse the detection zone and thus increase the precision of the sensor 1. Indeed, two particles of different sizes each have a distinct angular scattering.

The light source 30 is preferentially a laser source, and in particular a laser source of laser diode type. Alternatively, the light source 30 may be a light emitting diode, or LED. The focusing of the light radiation in the detection zone is obtained by a focusing optic. The light radiation emitted by the light source 30 preferentially has a power comprised between 1 mW and 20 mW, more preferentially a power comprised between 1 mW and 10 mW, even more preferentially a power comprised between 1 mW and 5 mW. The light radiation emitted by the light source 30 has for example a light radiation of 2 mW. The light source 30 can emit visible light radiation, that is to say of wavelength comprised in the interval [400 nm; 700 nm], or instead near infrared radiation, that is to say of wavelength comprised in the interval [700 nm; 900 nm]. To increase the metrological performances of the sensor in accordance with the Mie theory, visible light radiation of low wavelength, that is to say of wavelength comprised in the interval [400 nm; 500 nm], is the most efficient. However, a good performance-cost compromise is in particular obtained with visible radiation of wavelength comprised in the interval [600 nm; 700 nm], and more specifically of wavelength comprised in the interval [630 nm; 670 nm].

The first and second photodetectors 40, 50 are preferentially photodiodes. Alternatively, the first and second photodetectors 40, 50 could be photomultipliers. Compared to photomultipliers, photodiodes have the advantage of being cheaper and simpler to implement in miniature systems. Each of the first and second photodetectors 40, 50 has an active surface and a detection cone of axis normal to its active surface.

The light trap 60 comprises a wall 61 and a cavity 62, the wall 61 being oriented, with respect to the direction of propagation Dp, so as to deflect light radiation towards the cavity 62. The wall 61 and the cavity 62 are advantageously black so as to maximise absorption of incident light radiation. Advantageously, the wall 61 is smooth whereas the cavity 62 is rough. "Smooth surface" is taken to mean a surface having an arithmetic mean roughness Ra such that:

$$Ra < 0.1 \ \mu m$$

"Rough surface" is taken to mean a surface having an arithmetic mean roughness Ra such that:

$$Ra > 10 \ \mu m$$

The arithmetic mean roughness Ra is the standard deviation of surface asperities of the considered surface, such as defined in the ISO 4287 Standard.

The difference $\Delta\theta$ between the first and second angles $\theta 1$, $\theta 2$ is preferentially chosen in such a way that:

$$\Delta\theta > k \frac{d\lambda S}{P}$$

where:
- k is a constant expressed in rad/W/m$^{-4}$;
- d is the distance between each of the first and second photodetectors 40, 50 on the one hand, and the detection zone 115 on the other hand, expressed in m; if the first and second photodetectors 40, 50 are not equidistant from the detection zone 115, d is the smallest distance between each of the first and second photodetectors 40, 50 on the one hand and the detection zone 115;
- $\lambda$ is the wavelength of the light radiation, expressed in m;
- S is the active surface area of the first and second photodetectors, expressed in m$^2$;
- if the first and second photodetectors do not have the same active surface area, S is the largest active surface area of the first and second photodetectors;
- P is the power of the light source, expressed in W.

For a given configuration of the first and second photodetectors with respect to the detection zone and for a given wavelength of light radiation, the greater the power of the light source, the smaller the difference $\Delta\theta$ between the first and second angles $\theta 1$, $\theta 2$. Generally speaking, a difference $\Delta\theta$ of at least 5° and preferentially of at least 15° is chosen between the first and second angles $\theta 1$, $\theta 2$.

In the particular example of FIG. 4c, the first angle $\theta 1$ between the direction of propagation Dp and the first direction D1 is such that:

$$\theta 1 = 45°$$

and the second angle $\theta 2$ between the direction of propagation Dp and the second direction D2 is such that:

$$\theta 2 = 90°$$

The difference $\Delta\theta$ between the first and second angles $\theta 1$, $\theta 2$ is thus 45°.

Furthermore, the first and second directions D1, D2 are preferentially chosen in such a way that:
- the first direction D1 and the direction of propagation Dp define a first plane P1, and
- the second direction D2 belongs to a second plane P2 distinct from the first plane P1.

In the particular example of FIG. 4c, the second plane P2 is perpendicular to the first plane P1.

Still in the particular example of FIG. 4c, the axis of the detection cone of the first photodetector 40 is merged with the first direction D1, and the axis of the detection cone of the second photodetector 50 is merged with the second direction D2. However, the first photodetector 40 could alternatively be arranged in such a way that the axis of its detection cone is not merged with the first direction D1, for example by using a mirror to deflect the first scattering signal in a direction D1' and by arranging the first photodetector 40 in such a way that its detection cone is merged with the deflected direction D1'. Similarly, the second photodetector 50 could alternatively be arranged in such a way that the axis of its detection cone is not merged with the first direction D2, for example using a mirror to deflect the second scattering signal in a direction D2' and by arranging the second photodetector 50 in such a way that its detection cone is merged with the deflected direction D2'.

Figure 5:
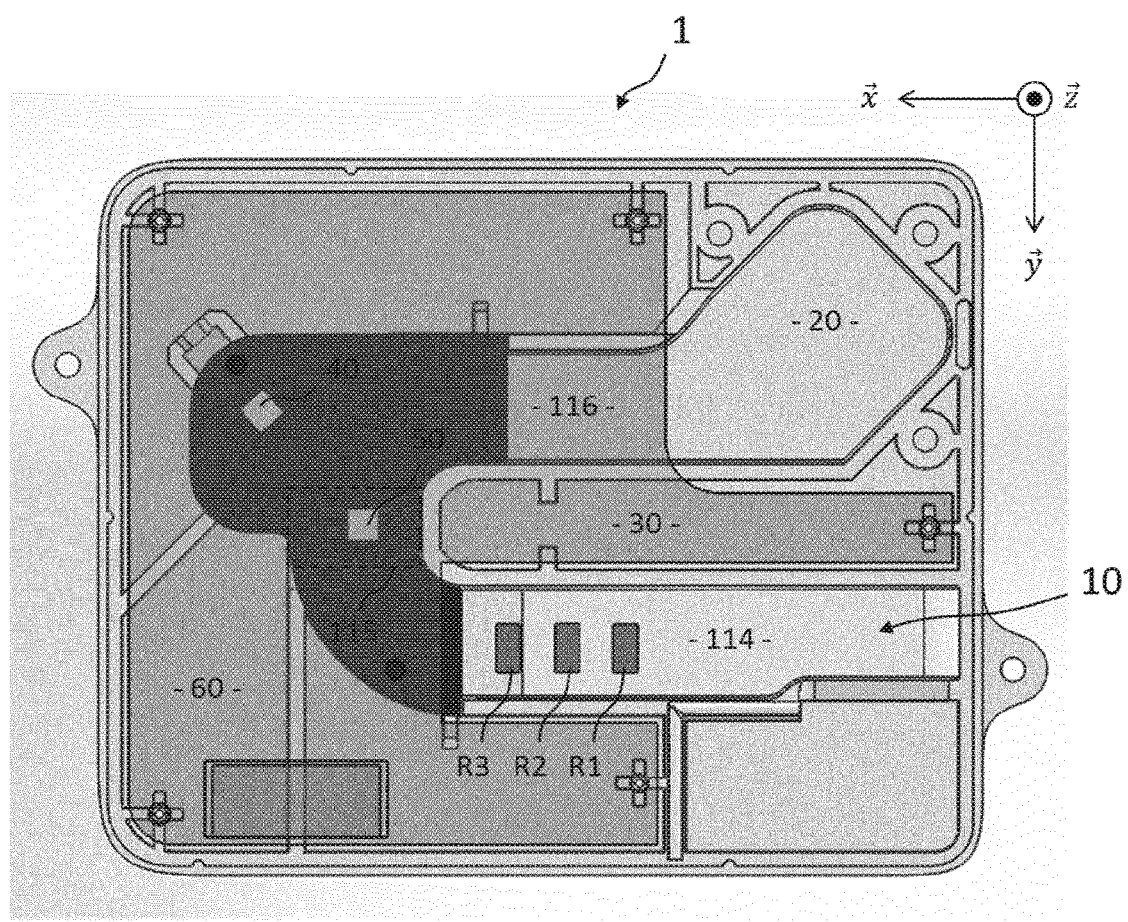
FIG. 5 schematically shows a view of a heating device of the sensor of FIG. 1 along a sectional plane of axes $\vec{x}$, $\vec{y}$.

FIG. 5 schematically shows a section view, along the plane B of axes $\vec{x}$, $\vec{y}$, of a device for heating the air stream circulating in the inner channel 10 of the sensor 1, the heating device comprising at least one Joule effect heating element arranged on a wall of the inner channel 10, upstream 114 of the detection zone 115. FIG. 5 particularly illustrates a function of thermal control of the hygrometry of the air stream circulating in the inner channel 10 of the sensor 1. The thermal control function is compatible with all the embodiments and characteristics described previously in relation with optical detection and fluidic circulation and notably with the embodiments described in relation with FIGS. 3a, 3b, 3c, 3d1, 3d2, 3d3.

The heating device advantageously enables control of the hygrometry of the particles of the air stream in order to be free of external atmospheric conditions. Indeed, certain types of particles swell significantly under the effect of humidity, which is liable, by modifying the size of the particles, to falsify the measurements. By controlling the hygrometry of the air stream, the precision of the sensor 1 is thus improved.

The Joule effect heating element is preferentially a resistance or alternatively a linear regulator.

The heating device preferentially comprises a plurality of Joule effect heating elements in series, said plurality being arranged on a wall of the inner channel upstream of the detection zone. This has the advantage of using a plurality of heating elements of smaller dimensions, rather than a single heating element of greater dimensions, and thus of minimising the mechanical perturbation of the air stream within the inner channel 10. In the particular example of FIG. 5, the heating device comprises first, second and third Joule effect heating elements R1, R2, R3.

Thanks to the at least one Joule effect heating element, the temperature of the air stream arriving in the detection zone is preferentially 3° C. to 10° C. higher than the temperature of the air stream entering into the sensor 1. This difference in temperature is sufficient to guarantee an absence of growth factor of the particles present in the air stream.

The sensor 1 preferentially comprises a temperature sensor and a humidity sensor and the at least one Joule effect heating element is preferentially enslaved as a function of a first temperature measurement and a second humidity measurement of the air stream in the sensor 1. The first temperature measurement and the second humidity measurement of the air stream may for example be carried out at the inlet or at the outlet of the inner channel 10 of the sensor 1, or at any intermediate point of the inner channel 10. An adaptation is thereby made to the external atmospheric conditions in order to improve the precision of the sensor while optimising its energy consumption.

The sensor 1 according to an aspect of the invention advantageously ensures at one and the same time the fluidic filter, optical detector and thermal control functions described previously, but the sensor 1 according to an aspect of the invention may alternatively only ensure one or two of these three functions, according to all possible combinations:
   fluidic filter function only,
   fluidic filter and optical detector functions,
   fluidic filter and thermal control functions,
   optical detector function only,
   optical detector and thermal control functions,
   thermal control function only.

The sensor 1 preferentially comprises a calculator and a storage memory in order to perform all or part of the following functions:
   controlling the circulation of the air stream in the sensor 1 by the circulating device 20, that is to say controlling the velocity and the flow rate of the air stream in the inner channel 10 of the sensor 1;
   processing the first and second scattering signals coming from the first and second photodetectors 40, 50 in order to calculate in real time a concentration of particulate matter of the air stream circulating in the inner channel 10 of the sensor 1;
   controlling the at least one resistance of the heating device as a function of the temperature and humidity measurements carried out by the temperature and humidity sensors.

The calculator is for example a microcontroller or a microprocessor. The storage memory is preferentially an EPROM (Erasable Programmable Read Only Memory) but may also be a RAM (Random Access Memory), a PROM (Programmable Read Only Memory), a FLASH-EPROM or any other memory chip or cartridge.

The invention claimed is:

1. A sensor for measuring in real time the concentration of particles in air, the sensor comprising an inner channel having:
   a first portion comprising a side wall extending between a first open end and a second closed end, the first open end extending along an inlet plane;
   a second portion communicating with the first portion via a first opening in the side wall of the first portion, the first opening being adjacent to the first open end;
   a storage zone communicating with the first portion via a second opening in the side wall of the first portion, the second opening being adjacent to the second closed end; the first and second openings being arranged on either side of the side wall;
   a baffle plate fixed to a junction between the first open end of the first portion and the second portion, the baffle plate extending inside the first portion and forming with a first direction normal to the inlet plane an angle α such that:

$$0° < \alpha < 90°$$

the baffle plate, the first portion and the first and second openings being dimensioned in such a way that in an air stream entering into the sensor through the first open end and comprising first particles of diameter less than or equal to 10 µm and second particles of diameter greater than 10 µm, the first particles are deflected by the baffle plate, pass through the first opening and arrive in the second portion of the inner channel whereas the second particles are deflected by the baffle plate impacted by a part of the side wall forming an impaction plate, pass through the second opening and arrive in the storage zone.

2. The sensor according to claim 1, wherein the second portion of the inner channel has a first open end communicating with the first portion of the inner channel and a second open end, wherein the sensor comprises a device for circulating an air stream in the inner channel, said device being arranged at the second end of the second portion of the inner channel and being configured to make an air stream circulate from the first end of the first portion of the inner channel to the second end of the second portion of the inner channel.

3. The sensor according to claim 2, wherein the device for circulating an air stream in the inner channel is a fan or a pump.

4. The sensor according to claim 1, wherein a first flow surface (S1) is defined, which is the surface along the inlet plane of the first open end and a second flow surface (S2), which is the smallest flow surface of the first portion, defined between the end of the baffle plate and the side wall, wherein the ratio S2/S1 of the second surface over the first surface is such that:

$$10\% \leq \frac{S2}{S1} \leq 90\%.$$

5. The sensor according to claim 1, wherein the second portion of the inner channel has a first open end communicating with the first portion of the inner channel and a second open end, and the second portion of the inner channel comprises a detection zone, an upstream zone between the first end and the detection zone and a downstream zone between the detection zone and the second end, wherein:
   the second portion of the inner channel has a folded back shape, and
   the upstream zone of the inner channel has an inclined portion widening between the first end of the inner channel and the detection zone,
      the inclined portion forming an angle β, measured with respect to the vertical, such that: $60° \leq \beta \leq 80°$, and
      the inclined portion widening by 150 µm² to 300 µm² per mm of length.

6. The sensor according to claim 1, wherein the storage zone has a volume comprised between 0.5 mL, and 5 mL.

7. The sensor according to claim 1, wherein the first portion of the inner channel is of circular section and wherein the sensor comprises an adaptor piece of hollow cylinder shape of circular section, the adaptor piece projecting from the sensor at the first open end of the first portion.

8. The sensor according to claim 1, wherein:
   the second portion has a first open end which communicates with the first portion and a second open end; a detection zone; an upstream zone between the first end and the detection zone; and a downstream zone between the detection zone and the second end;

the second portion has a folded back shape with a first rectilinear branch connected to a second rectilinear branch by a link substantially perpendicular to the first and second rectilinear branches, in such a way that the upstream zone comprises the first rectilinear branch, the downstream zone comprises the second rectilinear branch and the detection zone is found in the link between the first and second rectilinear branches.

9. The sensor according claim 8, wherein the upstream zone further comprises at least one portion having an S shape with first and second bends.

10. The sensor according to claim 1, wherein the inner channel extends at each point along a direction Dc and "section of a portion of the inner channel" is taken to mean a section normal to the direction Dc, wherein:

the second portion has a first open end which communicates with the first portion and a second open end; a detection zone; an upstream zone between the first end and the detection zone; and a downstream zone between the detection zone and the second end; and the upstream zone of the second portion comprises a laminarisation element, which comprises at least one plate projecting radially from a side wall of the second portion, said at least one plate having a height H measured radially and of which the ratio over the total height Ht measured radially between the side wall and the centre of the section is such that: $10\% \leq H/Ht \leq 100\%$.

11. The sensor according to claim 1, wherein the inner channel comprises a detection zone and wherein the sensor further comprises:

a light source configured to emit light radiation in a direction of propagation the light radiation being focused in the detection zone of the inner channel;

a first photodetector configured to capture a first scattering signal emitted by particles traversing the detection zone in a first direction forming a first non-zero angle with the direction of propagation of the light radiation;

a second photodetector configured to capture a second scattering signal emitted by particles traversing the detection zone in second direction forming a second non-zero angle with the direction of propagation of the light radiation, the second angle being different from the first angle and the first and second angles not being supplementary;

a light trap configured to receive the light radiation at the outlet of the detection zone so as to prevent parasitic return of the light radiation to the detection zone.

12. The sensor according to claim 1, wherein the inner channel comprises a detection zone and wherein the sensor further comprises a device for heating an air stream circulating in the inner channel, the heating device comprising at least one Joule effect heating element arranged on a wall of the inner channel upstream of the detection zone.

* * * * *